Patented Mar. 3, 1936

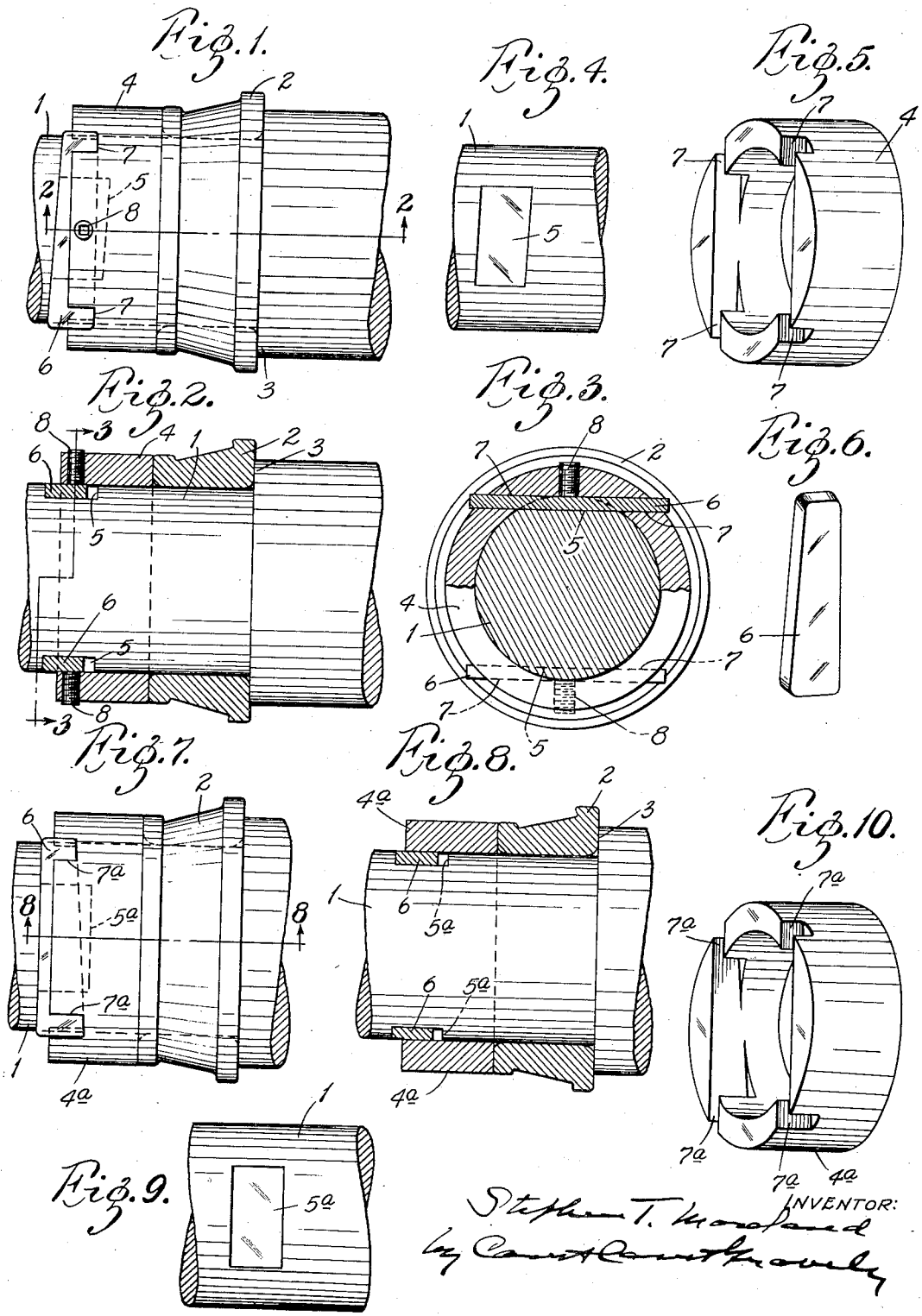

2,032,491

UNITED STATES PATENT OFFICE 2,032,491

RETAINING RING ATTACHMENT FOR SHAFTS

Stephen Theodore Moreland, Canton, Ohio, assignor to The Timken Roller Bearing Company, Canton, Ohio, a corporation of Ohio Application June 14, 1933, Serial No. 675,656

3 Claims. (Cl. 287—52.08)

This invention relates to improved means for rigidly securing a retaining ring to a shaft. It has for its principal objects to enable the retaining ring to be quickly and easily secured to the shaft, to provide for forcing the retaining ring against the member retained thereby, and to provide for simplicity and cheapness of construction and compactness of design. The invention consists in the combinations and arrangements of parts hereinafter described and claimed. In the accompanying drawing, which forms part of this specification and wherein like symbols refer to like parts wherever they occur, Figure 1 is a side view of a shaft and bearing retaining ring conforming to my invention, Figure 2 is a longitudinal section on the line 2—2, in Figure 1, Figure 3 is a transverse section on the line 3—3, in Figure 2, Figure 4 is a side view of the shaft, Figure 5 is a perspective view of the retaining ring, Figure 6 is a perspective view of the locking key, Figure 7 is a view similar to Figure 1 illustrating a modified form of locking device for the retaining ring, Figure 8 is a longitudinal section on the line 8—8, in Figure 7, Figure 9 is a side view of the shaft shown in Figure 7; and Figure 10 is a perspective view of the retaining ring shown in Figure 7.

For purposes of illustration, my invention is shown in connection with a shaft 1 having a sleeve, such, for instance, as the inner raceway member 2 of a roller bearing, mounted thereon between a shouldered portion 3 of said shaft and a retaining ring 4 sleeved on said shaft. Such arrangement of parts requires provision to be made for rigidly securing the retaining ring 4 to the shaft 1 in abutting relation to the inner raceway member 2 and for permitting ready release of said securing means.

As shown in Figures 1 to 6, inclusive, the cylindrical surface of the shaft 1 is provided with one or more grooves 5 that extend crosswise of said shaft. In the drawing, two such grooves are shown, one on each side of the shaft. Due to the curvature of the surface of the shaft, each groove 5 gradually decreases in depth from its middle to its ends where it merges into the cylindrical surface of the shaft. Each groove 5 is adapted to receive a locking key 6 preferably in the form of a flat wedge-shaped plate whose thickness corresponds to the maximum depth of said groove. Each key 6 is made long enough so that its end portions extend to or slightly beyond the outer periphery of the retaining ring 4. The retaining ring or collar 4 overlaps the inner portions of the diametrically opposed key receiving grooves 5 in the shaft 1 and is provided in its outer end with pairs of notches 7 adapted to be brought into register with the opposite ends of the respective groove to receive the portions of the keys that extend beyond said grooves.

In the construction shown in Figures 1 to 6, inclusive, each groove 5 is disposed at an oblique angle to the axis of the shaft 1, each locking key 6 is wedge-shaped and both of the key receiving notches 7 in the end of the retaining ring 4 are of the same depth. By this arrangement, pressure exerted on the wide end of the locking key causes one side edge of the key to bear against the outer side wall of the groove in the shaft and the other side edge of said key to bear against the bottoms of the notches in the retaining ring, thereby forcing said ring inwardly against the bearing member. If desired, a set screw 8 may be provided for holding each locking key against endwise movement in the groove therefor.

In the modified construction shown in Figures 7 to 10, inclusive, each key receiving groove 5ª in the shaft is disposed at right angles to the axis of said shaft, while the key receiving notches 7ª in the ends of the bearing retaining ring 4ª have their bottoms disposed in a plane extending at an oblique angle to said groove. Thus, one notch of each pair is deeper than the other notch of said pair, whereby one side edge of the locking key bears against the outer side wall of the groove 5ª therefor and the other side of said key bears at one end against the bottom of the deep notch and at the other end bears against the bottom of the shallow notch, thereby forcing the retaining ring inwardly against the bearing raceway 2 to clamp it tightly between the said ring and the shoulder on the shaft.

The construction hereinbefore described is simple, economical, compact and easy to manufacture and assemble and disassemble. It is strong and durable and contains a minimum number of parts. It is evident that changes may be made without departing from the invention, and I do not wish to be limited to the precise arrangements shown.

Having fully described my invention, what I desire to claim and secure by Letters Patent is:—

1. A shaft, a sleeve mounted on said shaft, a ring mounted on said shaft for retaining said sleeve thereon, said shaft having a groove extending crosswise thereof and said retaining ring having a pair of notches in one end adapted to register with the opposite ends of said groove, said notches being of a width corresponding to the maximum depth of said groove and having their outer walls disposed in a plane tangent to the shaft receiving opening in said ring, a wedge key adapted to engage said registering groove and notches, said key being of a thickness corresponding substantially to the maximum depth of said groove and the width of said notches, one of said grooves and notches having a surface at an oblique angle to the shaft axis, and a set screw threaded through said retaining ring in abutting relation to said key.

2. A rotary shaft, a sleeve mounted on said shaft, a ring mounted on said shaft at one end of said sleeve, said shaft having grooves on opposite sides thereof extending crosswise thereof, said locking ring having a plurality of pairs of notches in one end adapted to be brought into register with the opposite ends of the respective grooves, the two notches of each pair being of a width corresponding to the depth of said grooves and having a common outer wall disposed tangent to the shaft receiving opening in said ring, and separate, independently operable keys adapted to engage said grooves and the notches registering therewith, said keys being of a thickness corresponding substantially to the maximum depth of said grooves.

3. A rotary shaft, a sleeve mounted on said shaft, a ring mounted on said shaft for retaining said sleeve thereon, said shaft having grooves therein extending crosswise thereof on opposite sides thereof and said retaining ring having pairs of notches in one end adapted to register with the opposite ends of the respective grooves, said notches being of a width corresponding to the maximum depth of said grooves and having their outer walls disposed in a plane tangent to said shaft receiving opening in said ring, wedge keys adapted to engage said registering grooves and notches, said keys being of a thickness corresponding substantially to the maximum depth of said grooves and the width of said notches, one of said grooves and notches having a surface disposed at an oblique angle to the shaft axis.

STEPHEN T. MORELAND.